(12) United States Patent
Sjöstedt et al.

(10) Patent No.: US 10,648,498 B2
(45) Date of Patent: May 12, 2020

(54) FURNITURE PARTS COMPRISING A MALE PART AND A FEMALE PART OF A JOINT

(71) Applicant: IKEA SUPPLY AG, Pratteln (CH)

(72) Inventors: Göran Sjöstedt, Lönsboda (SE); Anders Paul Eriksson, Virestad (SE)

(73) Assignee: IKEA Supply AG, Pratteln (CH)

(*) Notice: Subject to any disclaimer, the term of this patent is extended or adjusted under 35 U.S.C. 154(b) by 212 days.

(21) Appl. No.: 15/548,723

(22) PCT Filed: Feb. 18, 2016

(86) PCT No.: PCT/SE2016/050128
§ 371 (c)(1),
(2) Date: Aug. 3, 2017

(87) PCT Pub. No.: WO2016/133455
PCT Pub. Date: Aug. 25, 2016

(65) Prior Publication Data
US 2018/0031019 A1    Feb. 1, 2018

(30) Foreign Application Priority Data

Feb. 20, 2015  (SE) ...................................... 1550197

(51) Int. Cl.
*F16B 12/12* (2006.01)
*F16B 12/22* (2006.01)
*F16B 21/09* (2006.01)

(52) U.S. Cl.
CPC ............ *F16B 12/125* (2013.01); *F16B 12/22* (2013.01); *F16B 21/09* (2013.01); *A47B 2230/0077* (2013.01); *A47B 2230/0081* (2013.01)

(58) Field of Classification Search
CPC ...... A47B 2088/951; A47B 2230/0029; A47B 2230/0037; A47B 2230/0077;
(Continued)

(56) References Cited

U.S. PATENT DOCUMENTS

| 4,932,105 A | * | 6/1990 | Muller | ................ B60R 13/0206 |
| | | | | 24/666 |
| 6,234,596 B1 | * | 5/2001 | Egger | .................... A47B 88/95 |
| | | | | 312/263 |

(Continued)

FOREIGN PATENT DOCUMENTS

| CN | 201916384 U | 8/2011 |
| CN | 201991892 U | 9/2011 |

(Continued)

OTHER PUBLICATIONS

Search Report for European Patent Application No. 16752740.7, dated Jul. 5, 2018.
(Continued)

*Primary Examiner* — Jonathan P Masinick
(74) *Attorney, Agent, or Firm* — Merchant & Gould P.C.

(57) ABSTRACT

The disclosure relates to a first furniture part adapted to be assembled with a second furniture part. The first furniture part comprises recess and the second furniture part comprises a pin. The recess and the pin has a width which varies along the longitudinal direction (L), thereby forming insertion portions of the recess and core portions of the pin, and respective locking portions. The locking portions are provided with grooves and protrusions. The disclosure further relates to a second furniture part comprising a male part of the joint and to a method of forming a furniture part with a female part of a joint.

7 Claims, 4 Drawing Sheets

(58) Field of Classification Search
CPC ...... A47B 47/042; F16B 12/12; F16B 12/125; F16B 12/22; F16B 12/24; F16B 2012/103; F16B 21/09; F16B 5/0004; F16B 5/0024; F16B 5/0032; F16B 5/0036; F16B 5/0055

See application file for complete search history.

(56) References Cited

U.S. PATENT DOCUMENTS

| | | | | |
|---|---|---|---|---|
| 8,641,315 | B2* | 2/2014 | Liu | A47B 95/00 403/297 |
| 8,992,238 | B2* | 3/2015 | Chinn | F16B 21/09 439/116 |
| 10,138,917 | B2* | 11/2018 | Koch | F16B 5/0052 |
| 10,197,081 | B2* | 2/2019 | Koelling | F16B 12/125 |
| 2011/0260592 | A1* | 10/2011 | Lin | A47B 47/042 312/265.5 |
| 2012/0080910 | A1 | 4/2012 | Davis | |
| 2013/0239509 | A1* | 9/2013 | Wang | F16B 12/125 52/704 |
| 2014/0205373 | A1 | 7/2014 | Andersson et al. | |
| 2014/0255093 | A1 | 9/2014 | Yang | |
| 2014/0294498 | A1* | 10/2014 | Logan | A47B 47/042 403/376 |
| 2018/0112696 | A1* | 4/2018 | Davis | A47B 47/042 |
| 2018/0283431 | A1* | 10/2018 | Andersson | A47B 47/042 |

FOREIGN PATENT DOCUMENTS

| | | | |
|---|---|---|---|
| CN | 102917616 A | 2/2013 | |
| CN | 103038521 A | 4/2013 | |
| CN | 203676487 U | 7/2014 | |
| DE | 10056666 A1 | 5/2001 | |
| DE | 102007058662 A1 | 6/2009 | |
| DE | 202011109972 U1 | 8/2012 | |
| DE | 102011122697 A1 * | 6/2013 | ............ F16B 12/125 |
| EP | 2807950 A1 | 12/2014 | |
| WO | WO 00/26545 A1 | 5/2000 | |
| WO | WO 2011/151758 A3 | 12/2011 | |
| WO | WO 2011/160173 A1 | 12/2011 | |

OTHER PUBLICATIONS

Office Action for Chinese Patent Application No. 201680009056.0, dated Sep. 3, 2018.

Communication pursuant to Article 94(3) EPC for European Patent Application No. 16752740.7, dated May 14, 2019.

International Search Report and Written Opinion for PCT/SE2016/050128, dated Apr. 19, 2016.

* cited by examiner

FURNITURE PARTS COMPRISING A MALE PART AND A FEMALE PART OF A JOINT

This application is a National Stage Application of PCT/SE2015/050128 filed 18 Feb. 2016, which claims benefit of Swedish Patent Application No. 1550197-06, filed 20 Feb. 2015, which applications are incorporated herein by reference. To the extent appropriate, a claim of priority is made to each of the above disclosed applications.

FIELD OF INVENTION

The inventions relates to a furniture part comprising a female part of a joint. The invention also relates to a furniture part comprising a male part of a joint. The invention also relates to a method of forming a furniture part with a female part of a joint.

TECHNICAL BACKGROUND

To join furniture parts to each other many different ways have been used throughout the years. Often different types of mechanical fastening elements are used. It is also known to give the furniture parts different shapes, such as grooves, for forming joints between the furniture parts.

For self-assembly furniture it is desirable that the different furniture can be assembled to each other in a safe and relatively simple way. This is especially desirable when the customer is to assemble the furniture. It is therefore an on-going aspiration within the furniture industry to improve the joints between the different furniture parts. Such improvements of joints have many aspects. The improvements may concern the strength of the joint, the correctness of the joint, the manufacturing cost, ease of assembly, possibility to be separated again once assembled, etc.

DE 10 2007 058 662 A1 discloses a joint system with elongate pins adapted to be received in elongate recesses. The recesses extend has an elongated form in a first surface or are even through-going between two major surfaces. The recesses present an access opening in a surface transverse to the first surface.

US 2014/0205373 A1 discloses a plurality of different embodiments of a joint for assemble of two furniture parts to each other.

SUMMARY OF INVENTION

It is an object of the invention to provide a furniture joint for assembly of furniture parts. It is desirable that the furniture parts may be assembled without the need of any separate fastening means and without the use of any tools. It is desirable that the joint is easy to assemble and yet give a secure assembly of the furniture parts. It is desirable that the furniture parts after assembly may once again be separated from each other, without damaging the furniture parts. It is desirable that the joint is designed such that it is easy to manufacture the different furniture parts. It is desirable that the joint is invisible when the furniture parts have been assembled.

This object has been achieved by a joint comprising a first furniture part comprising a female part of the joint and a second furniture part comprising a male part of the joint.

The first furniture part comprises a female part of a joint. The female part of the joint comprises an elongate recess having a recess length extending along a longitudinal direction, the recess having a width which varies along the longitudinal direction, and the recess having a depth. Thus, preferably the width of the recess is smaller than the recess length. The three geometrical directions (longitudinal, width and depth) are preferably orthogonal to each other, basically forming a Cartesian coordinate system. However, it is contemplated that the invention may be used in skewed recesses. For instance, the depth direction may be inclined relative to the normal direction of the plane formed of the longitudinal direction and the width.

Along the longitudinal direction, the recess has a first portion forming an insertion portion and having a first width; a second portion connected to the first portion and forming a locking portion and having a second width being smaller than the first width; a third portion forming an insertion portion and having a third width; and a fourth portion connected to the third portion and forming a locking portion and having a fourth width being smaller than the third width. In a first step, the first portion of the recess is adapted to receive a locking portion of a male part of a second furniture part and the third portion of the recess is adapted to receive another locking portion of the male part of the second furniture part. In a second step, the furniture parts are adapted to be slid relative to each other along the longitudinal direction whereby the second portion is adapted to engage with the first locking portion of the male part and the third portion is adapted to engage with the other locking portion of the male part of the second furniture part. It may be noted that the first to fourth portions are all included in a single recess and that they all are located along the longitudinal direction thereby providing an elongate recess in which the male part may be slid along the longitudinal direction.

It may be noted that the width of the first portion may be chosen independently of the width of the third portion. Similarly, the width of the second portion may be chosen independently of the width of the fourth portion. By designing the recess such that the width of the first and third portions are different in width, shape or size, it is possible to design the joint such that it may only be assembled in one orientation of the furniture parts.

Opposing, longitudinally extending, side wall portions of the second portion are each provided with a first groove and a second groove extending alongside each other and both extending in the longitudinal direction along the second portion, wherein the first groove is located at a first depth of the recess and the second groove is located at a second depth of the recess, which second depth is larger than the first depth. The first groove is adapted to receive a first protrusion on the male part and the second groove is adapted to receive a second protrusion on the male part. Thereby it is prevented that the male part is pulled out of the recess along the depth direction. The first and second groove may have different cross-sections.

Opposing, longitudinally extending, side wall portions of the fourth portion are each provided with a first groove and a second groove extending alongside each other and both extending in the longitudinal direction from the third portion into and along the fourth portion, wherein the first groove is located at a first depth of the recess and the second groove is located at a second depth of the recess, which second depth is larger than the first depth. Similarly as for the second portion, the first groove is adapted to receive a first protrusion on the male part and the second groove is adapted to receive a second protrusion on the male part. Thereby it is prevented that the male part is pulled out of the recess along the depth direction. The first and second groove may have different cross-sections.

With this inventive design, with a plurality of insertions portions and a plurality of locking portions in combination with a plurality of grooves at different depths it has become possible to design strong joints relative to the material thickness of the furniture parts.

The recess is preferably formed with the furniture part completely surrounding the recess in the longitudinal and width direction. By providing the recess with insertion portions, there is no need for any access opening in any surface transverse to the surface in which the recess is formed.

It may be noted that the different portions may be designed uniquely. However, it is preferred that the different portions which correspond to each other are formed uniformly. The first portion and the third portion have preferably the same width, and more preferably even the same shape and dimensions. The second and fourth portions have preferably the same width, and more preferably the corresponding portions having the same shape and dimensions. The second portion will transition into the third portion whereas the fourth portion will have a unique portion in the direction facing away from the third portion. The grooves of the second portion are preferably aligned with the grooves of the fourth portion, such that they geometrically become continuous grooves from the second to the fourth portion but physically broken by the third portion. The grooves at the first depth have preferably the same cross-section as the grooves at the second depth. One major advantage of having the corresponding portions uniformly formed is that it facilitates manufacturing.

In the following description, explanations concerning different properties and they way different parts interact will, for clarity reasons, mostly be given based on a preferred embodiment with uniformly formed portions. However, it should be noted that, as is specified in the claims, it is not necessary to have the corresponding portions to be uniformly shaped.

Preferred embodiments appear in the dependent claims and in the description.

Each groove may have a cross-section, across the longitudinal direction, comprising an upper major wall portion being inclined in a direction outwardly and downwardly and a lower major wall portion being inclined in a direction outwardly and upwardly and a groove bottom portion connecting said upper and lower wall portions. Thereby the wall portions will be forming a groove with an essentially V-shaped cross-section.

In this context it may be noted that upper is considered closer to the opening of the recess than lower, or expressed the other way around, lower is considered deeper down in the recess than upper. Downwardly is considered to be a direction extending deeper into the recess as indicated by the arrow D. Upwardly is considered a direction extending towards the opening of the recess. Outwardly is considered to be a direction extending from a longitudinal centre line. In the recess, the outwardly extending walls of the grooves extend into the material surrounding the recess.

Such a shape provides strong walls even if the grooves are placed close to each other and it makes it possible to design strong protrusions adapted to engage with respective groove. Preferably, the upper major wall portion constitutes 40-60% of the groove along the depth direction. Preferably, the lower major wall portion constitutes 40-60% of the groove along the depth direction. Preferably, the upper major wall portion is inclined at an angle of between 30-60° relative to the depth direction. Preferably, the lower major wall portion is inclined at an angle of between 30-60° relative to the depth direction.

At the transition between the first and second portion and at the transition between the third and fourth portion, respective groove may comprise an inlet portion with a widened opening facing the first and respectively the third portion, wherein the inlet portion is gradually narrowing along the longitudinal direction, with the gradual narrowing being formed by a gradual increase in height of the upper and lower wall portions of the cross-section of the groove as seen along the longitudinal direction. This may be achieved by having the upper and lower wall portions increasing in height from a first height at the end of the inlet portion facing the first and respectively the third portion to a second height at the end of the inlet portion facing the remainder of the second and respectively the fourth portion. This way the protrusions of the male part will be guided into respective groove. This may be used to provide a pulling force pulling the furniture parts together and thereby providing an even stronger clamping force than the customer applies when beginning to slide the furniture parts relative to each other along the longitudinal direction. It may be noted that the pulling force is mostly due to the transition of the upper major wall portion interacting with the respective protrusion. Thus, it is contemplated that the upper major wall portion of the cross-section of the groove may be inclined in a direction outwardly and downwardly and that the lower major wall portion may be shaped differently from the previously mentioned upward outward inclination. The lower major wall portion may e.g. be shaped as a planar surface extending in the width direction of the recess.

The inlet portion may constitute between 10% and 33% of the active length of respective groove. The active length is considered to be the length the second furniture part slides along the first furniture part as the parts are locked together. This will provide a smooth transition and yet it will provide a sufficient active length of the groove adapted for full engagement with the protrusion of the male part of the joint.

The female part of the joint is preferably integrally formed into the furniture part. This facilitates e.g. correct positioning of the joint relative to the surfaces of the furniture parts that are adapted to abut each other as the joint is assembled.

The first groove of the second portion may have the same cross-sectional shape as and may be aligned with the first groove of the fourth portion. The second groove of the second portion may have the same cross-sectional shape as and may be aligned with the second groove of the fourth portion. This facilitates the manufacturing of the recess since the different portions may be machined using the same tool or be machined at the same time using two identical tools.

The width of the first portion may be equal to the width of the third portion. This facilitates the manufacturing of the recess since they may be machined using the same tool or be machined at the same time using two identical tools.

A greatest width of the first or third portion may be between 25-90% of a minimum width of the furniture part along the recess. This way the joint is made strong in relation to the available dimension of the furniture part. More preferably a greatest width of the first or third portion may be between 40-90% of a minimum width of the furniture part along the recess. Most preferably a greatest width of the first or third portion may be between 50-90% of a minimum width of the furniture part along the recess.

As mentioned above, there has been achieved a joint comprising a first furniture part comprising a female part of the joint and a second furniture part comprising a male part of the joint.

The second furniture part comprises the male part of the joint. The male part the joint comprises a pin extending from a base of the furniture part along a height direction towards a free end of the pin, the pin having an elongated cross-section with a pin length extending along a longitudinal direction, the cross-section having a width which is perpendicular to the longitudinal direction, which width varies along the longitudinal direction. Thus, preferably the pin width is smaller than the pin length. As for the recess of the female part, the three geometrical directions (height, longitudinal and width) are preferably orthogonal to each other.

Along the longitudinal direction, the pin has a first portion forming a locking portion and having a first width; a second portion connected to the first portion and forming an insertion or core portion and having a second width being smaller than the first width; and a third portion forming a locking portion and having a third width.

In a first step, the first portion of the pin is adapted to be received in an insertion portion of a female part of a first furniture part and the third portion of the pin recess is adapted to be received in another insertion portion of the female part of the first furniture part. The smaller core portion of the pin is adapted to extend in a smaller locking portion of the female part of the joint. In a second step, the furniture parts are adapted to be slid relative to each other along the longitudinal direction whereby the first portion of the pin is adapted to engage with a first locking portion of the female part and the third portion of the pin is adapted to engage with the another locking portion of the female part of the first furniture part.

It may be noted that the width of the first portion may be chosen independently of the width of the third portion. Similarly, the width of the second portion may be chosen independently of the width of the third portion. By designing the pin such that the width of the first and third portions are different in width, shape or size, it is possible to design the joint such that it may only be assembled in one orientation of the furniture parts.

Opposing, longitudinally extending, side wall portions of the first portion are each provided with a first protrusion and a second protrusion extending alongside each other and both extending in the longitudinal direction along the first portion and extending outwardly in the direction of the width from a first portion core width to said first width, wherein the first protrusion is located at a first height of the pin and the second protrusion is located a second height of the pin, which second height is larger than the first height.

Opposing, longitudinally extending, side wall portions of the third portion are each provided with a first protrusion and a second protrusion extending alongside each other and both extending in the longitudinal direction along the third portion and extending outwardly from a third portion core width to said third width, wherein the first protrusion is located at a first height of the pin and the second protrusion is located a second height of the pin, which second height is larger than the first height.

Similarly as for the recess, it may be noted that the different portions may be designed uniquely. However, it is preferred that the different portions which correspond to each other are formed uniformly. The first and third portions have preferably the same width and core width, and more preferably the corresponding portions of them having the same shape and size.

The protrusions of the first portion are preferably aligned with the protrusions of the third portion, such that they geometrically become continuous protrusions from the first to the third portion but physically broken by the second portion. The protrusions at the first height have preferably the same cross-section as the protrusions at the second height. One major advantage of having the corresponding portions uniformly formed is that it facilitates manufacturing.

In the following description, explanations concerning different properties and they way different parts interact will, for clarity reasons, mostly be given based on a preferred embodiment with uniformly formed portions. However, it should be noted that, as is specified in the claims, it is not necessary to have the corresponding portions to be uniformly shaped.

Preferred embodiments appear in the dependent claims and in the description.

A greatest width of the first or third portion of the pin may be at least 50% of a minimum width along the base of the furniture part. This way the joint is made strong in relation to the available dimension of the furniture part.

The length of the pin and the placement of the pin relative to the second furniture part are preferably such that the surface of the second part from which the pin extends covers the recess in the first part once the pin has been moved to the assembled position. This may e.g. be accomplished by the surface from which the pin extends having a width exceeding the width of the recess and the surface having a length from the pin and counter to the longitudinal direction exceeding the distance the pin is slid from the insertion position to the locking position. The length of the pin along the longitudinal direction is preferably at least 50% of the length of the second part along the longitudinal direction. The length of the pin along the longitudinal direction is preferably at least 50% of the length of the surface (from which the pin extends) along the longitudinal direction.

Each protrusion may have a cross-section, across the longitudinal direction, comprising an upper major wall portion being inclined in a direction outwardly and downwardly and a lower major wall portion being inclined in a direction outwardly and upwardly and a protrusion top portion connecting said upper and lower wall portions. Thereby the wall portions will be forming protrusion with an essentially V-shaped cross-section. Preferably, the upper major wall portion constitutes 40-60% of the protrusion along the height direction. Preferably, the lower major wall portion constitutes 40-60% of the protrusion along the height direction. Preferably, the upper major wall portion is inclined at an angle of between 30-60° relative to the height direction. Preferably, the lower major wall portion is inclined at an angle of between 30-60° relative to the height direction.

In this context it may be noted that upper is considered closer to the opening of the recess than lower, or expressed the other way around, lower is considered deeper down in the recess than upper. Downwardly is considered to be a direction extending deeper into the recess as indicated by the arrow D. Upwardly is considered a direction extending towards the opening of the recess. Outwardly is considered to be a direction extending from a longitudinal centre line. In the recess, the outwardly extending walls of the grooves extend into the material surrounding the recess. In the pin, the outwardly extending walls of the grooves extend away from the material forming the core of the pin.

The male part of the joint is preferably integrally formed in the furniture part. This facilitates e.g. correct positioning of the joint relative to the surfaces of the furniture parts that are adapted to abut each other as the joint is assembled.

At the transition between the first and second portion and at a portion of the third portion facing away from the second portion, respective protrusion comprises an initial portion formed by a gradual increase in height of the upper and lower wall portions of the cross-section of the protrusion as seen counter to the longitudinal direction. This may be achieved by having the upper and lower wall portions increasing in height from a first height at the end of the initial portion of the first portion facing the second portion and at the end of the initial portion of the third portion facing away from the second portion, to a second height at the end of the initial portion facing the remainder of the first portion and respectively the third portion. This way the protrusions of the male part will be guided into respective groove of the recess. This may be used to provide a pulling force pulling the furniture parts together and thereby providing an even stronger clamping force than the customer applies when beginning to slide the furniture parts relative to each other along the longitudinal direction. It may be noted that the pulling force, it is mostly due to the transition of the upper major wall portion interacting with the respective groove. Thus, it is contemplated that the upper major wall portion of the cross-section of the protrusion may be inclined in a direction outwardly and downwardly and that the lower major wall portion may be shaped differently from the previously mentioned upward outward inclination. The lower major wall portion may e.g. be shaped as a planar surface extending in the width direction of the pin.

The inlet portion of the third portion may be formed by the end of the third portion facing away from the second portion having a convex curvature, preferably circular. By providing the convex curvature, i.e. a convex outwardly bulging end of the pin, a uniformly formed protrusion will automatically present the inlet portion when viewed counter to the longitudinal direction.

The initial portion may constitute between 10% and 33% of the active length of respective protrusion. The active length is considered to be the length the second furniture part slides along the first furniture part as the parts are locked together. This will provide a smooth transition and yet it will provide a sufficient active length of the protrusion adapted for full engagement with the groove of the female part of the joint.

The first protrusion of the first portion may have the same cross-sectional shape as and may be aligned with the first protrusion of the third portion, and wherein the second protrusion of the first portion may have the same cross-sectional shape as and may be aligned with the second protrusion of the third portion. This facilitates the manufacturing of the pin since the different portions may be machined using the same tool or be machined at the same time using two identical tools.

The invention also relates to a method of forming a furniture part with a female part of a joint, the method comprising:

providing at least two holes adapted to form insertion portions of the joint, the holes being arranged side by side extending in a common depth direction into the furniture part, the holes being spaced apart as seen along a longitudinal direction being perpendicular to the depth direction, extending at least one milling or broaching tool into a least one of the holes, moving the milling or broaching tool or tools at least partly along the longitudinal direction such that the tool or tools removes material such that the holes are connected with each other forming a single recess including said holes.

Preferably the method comprises extending one milling or broaching tool into each hole.

Preferably the milling or broaching tool or tools has shape and dimensions corresponding to the second and fourth portions including the shape and dimensions of the grooves of the second and fourth portions, whereby the tool or tools is moved in an rectilinear movement along the longitudinal direction, thereby forming the second and fourth portions including the grooves of the second and fourth portions.

The invention may also be said to relate to furniture comprising a first furniture part with a female part of a joint and a second furniture part with a male part of the joint.

The invention may also be said to relate to a method of joining a first furniture part to a second furniture part, wherein the furniture parts are joined together by aligning the locking portions of the second furniture part with the insertion portions of the first furniture part; moving the second furniture part relative to the first furniture part in a direction along the height of the pin to insert the pin of the second furniture part into the recess of the first furniture part; moving the second furniture part relative to the first furniture part along the longitudinal direction such that the protrusions of the pin enters into the grooves of the recess.

The first and second furniture parts are preferably wood based. They may be manufactured from natural wood. They may be manufactured from glued timber pieces where a plurality of ribs are glued together. They may be manufactured from wood laminates, such as plywood, or from laminates of wood-like materials, such as bamboo. They may be manufactured from wood based composite materials, such as fibreboards, chipboards, or the like.

Preferably the recess is formed directly into the first furniture part. This may e.g. be performed by drilling and milling the different portions and grooves directly into the furniture part.

Preferably the pin is integrally formed with the second furniture part. This may e.g. be performed by milling the different portions and protrusions directly into the furniture part thereby leaving the pin as a result of the milling operation.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

As shown in the figures, a first furniture part 1 adapted to be assembled with a second furniture part 2. The first furniture part 1 comprises a female part of the joint and the second furniture part 2 comprises a male part of the joint, wherein the female part of the joint is adapted to receive the male part of the joint.

The female part of the joint comprises an elongate recess 10 extending along a longitudinal direction L. The recess 10 has a width $W_{11}$, $W_{12}$ which varies along the longitudinal direction L and a depth D. Along the longitudinal direction L, the recess 10 has three insertion portions 11a-c. The insertion portions 11a-c are equidistantly arranged. The insertions portions 11a-c has a width $W_{11}$. The recess 10 further comprises three locking portions 12a-c. The locking portions 12a-c are equidistantly arranged. The locking portions 12a-c has a width $W_{12}$, which is smaller than the width $W_{11}$ of the insertion portions 11a-c. The insertion portions 11a-c are basically formed as circular cylindrical holes to a depth D into the first furniture part 1. The width $W_{11}$ of the insertion portions 11a-c is basically the diameter of the insertion portions 11a-c. The walls of the insertion portions 11a-c are smooth walls. Two (12a, 12c) of the locking portions 12a-c are formed as two, along the longitudinal direction L straight walled narrower portions located between the insertion portions 11a-c. It may be noted that straight relates to the fact that they are straight along the longitudinal direction. Along the depth direction D they are provided with grooves. The end locking portion 12b is also formed with a straight walled portion along the longitudinal direction L and terminates in a circular end with a diameter equal to the width $W_{12}$.

Opposing longitudinal side wall portions 14a-c of the locking portions 12a-c are each provided with a first groove 13a extending in the longitudinal direction L and being located at a first depth $D_{13a}$ of the recess 10 and a second groove 13b extending in the longitudinal direction L and being located below the first groove 13a at a second depth $D_{13b}$ of the recess 10.

The male part of the joint comprises a pin 20 extending from a base 2 along a height direction H towards a free end of the pin 20. The pin 20 has an elongated cross-section extending along the longitudinal direction L and having a width W which varies along the longitudinal direction L. Along the longitudinal direction L, the pin 20 has three locking portions 21a-c. The locking portions 21a-c are equidistantly arranged. The locking portions 21a-c has a width $W_{21}$. The pin 20 further comprises two insertions or core portions 22a-b. The core portions 22a-b have a width $W_{22}$, which is smaller than the width $W_{21}$ of the locking portions 21a-c.

Opposing side wall portions 24a-c of the locking portions 21a-c are each provided with a first protrusion 23a extending along the longitudinal direction L and extending outwardly from a core width $W_{20}$ to the outer width $W_{21}$ of the locking portions 21a-c and being located at a first height $H_{23a}$ of the pin 20, and with a second protrusion 23b extending along the longitudinal direction L and extending outwardly from a core width $W_{20}$ to the outer width $W_{21}$ of the locking portions 21a-c and being located above the first protrusion at a second height $H_{23b}$ of the pin 20.

It may be noted that if the recess 10 is designed with only two insertion portions and two locking portions, it is preferred that the two portions are designed as the end portions in the shown embodiment and that the centre insertion portion and the centre locking portion are removed.

It may be noted that the nomenclature in the description of the preferred embodiment of the recess may be translated to the nomenclature of the description of the recess under the heading "summary of the invention" according to the following. The end insertion portion 11a is also denoted the first insertion portion. The other end insertion portion 11b in the longitudinal direction L is also denoted the third portion. The end locking portion 12a is also denoted the second portion. The other end locking portion 12b is also denoted the fourth portion.

Thus, in the preferred embodiment of the recess there is a set of portions from first to fourth portions and the recess further comprises an additional insertion portion and an additional, associated locking portion located between the set comprising the first and second portions and the set comprising the third and fourth portions. It may be noted that there may be any desired number of such additional sets of an insertion portion and an associated locking portion between the associated first and second portions and the associated third and fourth portions.

It may be noted that if the pin 20 is designed with only two locking portions and one insertion or core portion, it is preferred that the two locking portions are designed as the two end portions in the shown embodiment. The core portion will preferably be designed as any one of the core portions in the shown embodiment.

It may be noted that the nomenclature in the description of the preferred embodiment of the pin may be translated to the nomenclature of the description of the pin under the heading "summary of the invention" according to the following. The end locking portion 21a is also denoted the first portion. The core portion 22a is also denoted second portion. The other end locking portion 21b is also denoted third portion.

Thus, in the preferred embodiment of the recess there is a set of portions from first to third portions and the pin further comprises an additional core portion and an additional locking portion located between the second portion forming the core portion and the third portion forming the end locking portion. It may be noted that there may be any desired number of such additional sets of a core portion and an associated locking portion between the second portion and the third portion.

It is also contemplated to design the joint with a pin having one locking portion followed by an elongated core portion (as seen in a direction counter the longitudinal direction). The recess will in such a case preferably have a locking portion, followed by a core portion and by a guiding portion (as seen in a direction counter the longitudinal direction). The core portion of the pin is in such a case preferably of such length along the longitudinal direction that it may engage with the side walls of the guiding portion of the recess.

The first furniture part 1 is joined together with the second furniture part 2 in accordance with the following steps.

Figure 1A:
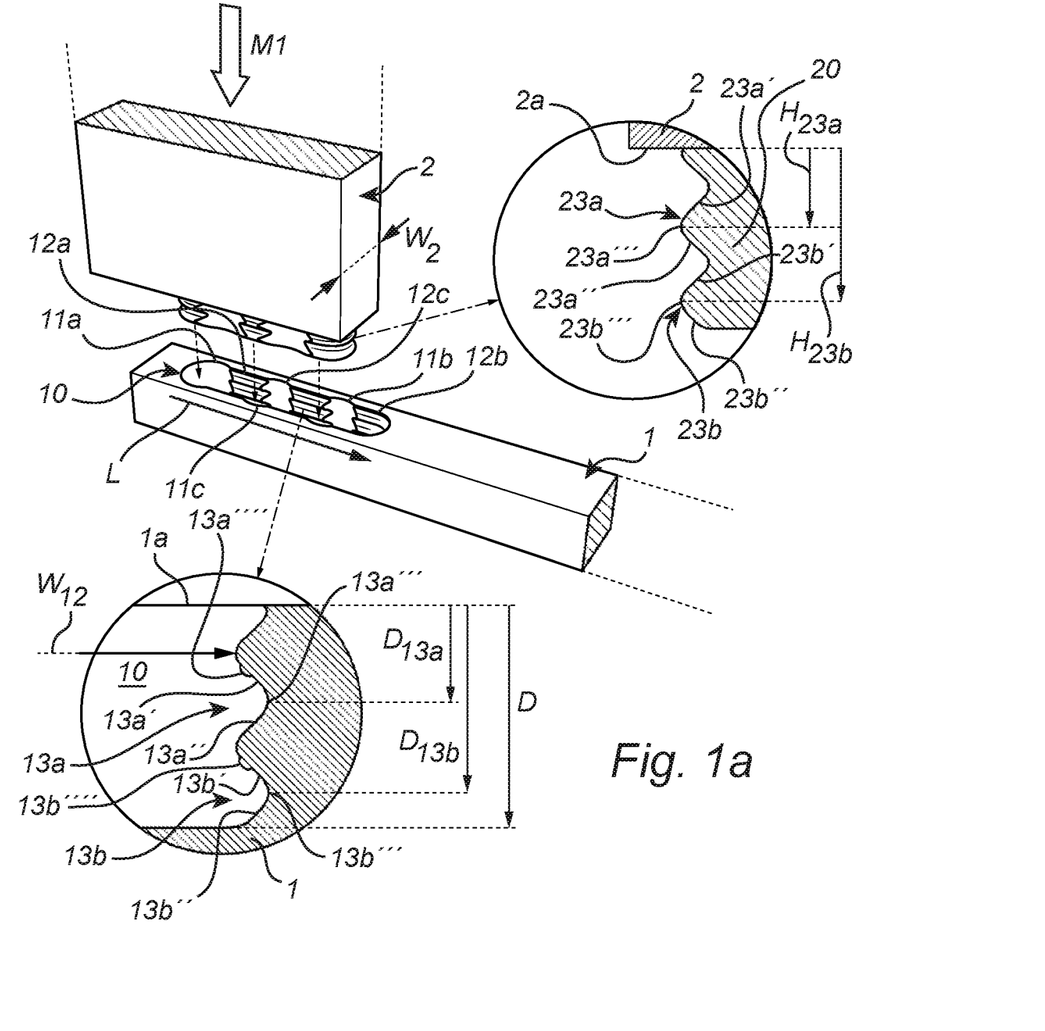
FIG. 1a shows a first furniture part with a female part of a joint and a second furniture part with a male part of the joint.

First the second furniture part 2 is oriented and positioned relative the first furniture part 1 such that the locking portions 21a-c of the pin 20 are aligned with the core portions 21a-c of the recess 10. This is shown in FIG. 1a.

Thereafter the second furniture part 2 is moved (in a translational movement) relative to the first furniture part 1 in a direction along the height H of the pin 20 to insert the pin 20 of the second furniture part 2 into the recess 10 of the first furniture part 1. The insertions portions 11a-c of the recess 10 have such shape and dimensions that they can accommodate the locking portions 21a-c of the pin. The core portions 22a-b of the pin 20 have such shape and dimensions that they can be inserted in the locking portions 12a, 12c of the recess 10. This movement is indicated with the arrow M1 in FIG. 1a. The position after this movement M1 is shown in FIG. 1b and FIG. 2.

Figure 2:
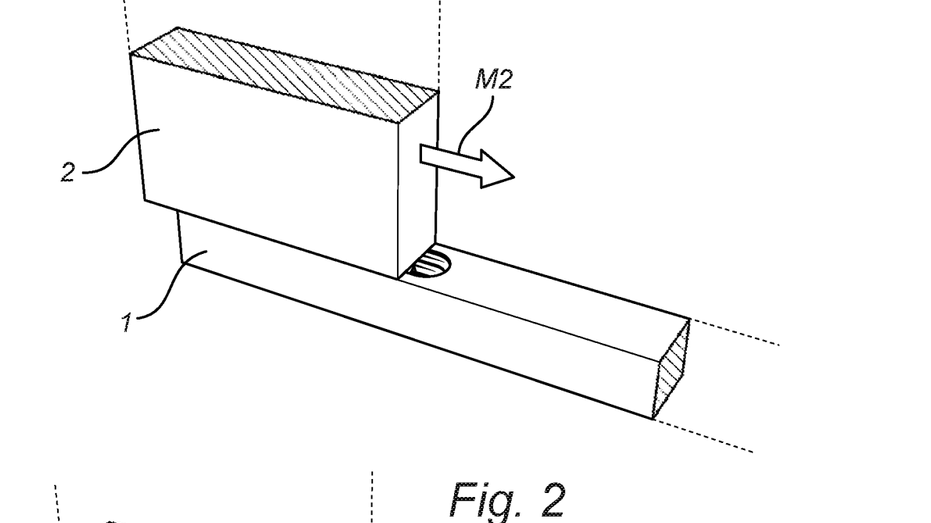
FIG. 2 shows the male part of the joint being inserted into the female part of the joint and indicates the direction towards the locked position.

Thereafter the second furniture part 2 is moved relative to the first furniture part 1 along the longitudinal direction L such that the protrusions 23*a-b* of the pin 20 enters into the grooves 13*a-b* of the recess 10. This movement is indicated with the arrow M2 in FIG. 2. The position after this movement M2 is shown in FIG. 3*a* and FIG. 3*b*.

Figure 3A:
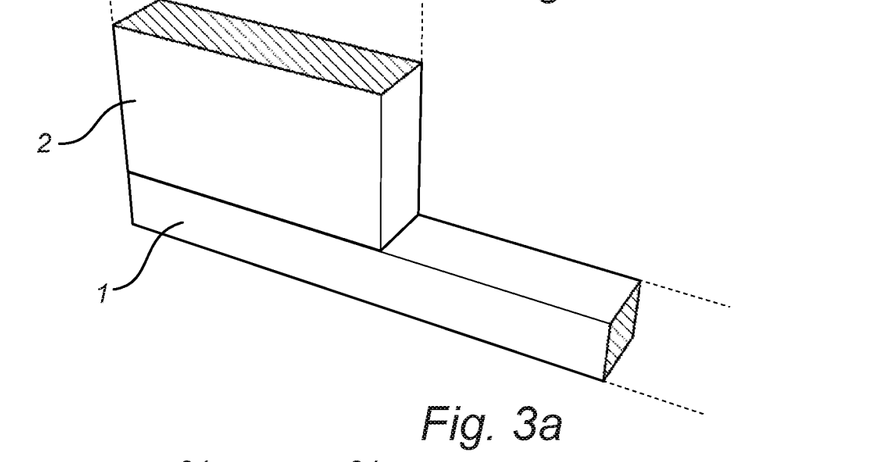
FIG. 3a shows the furniture parts in the locked position.
Figure 3B:
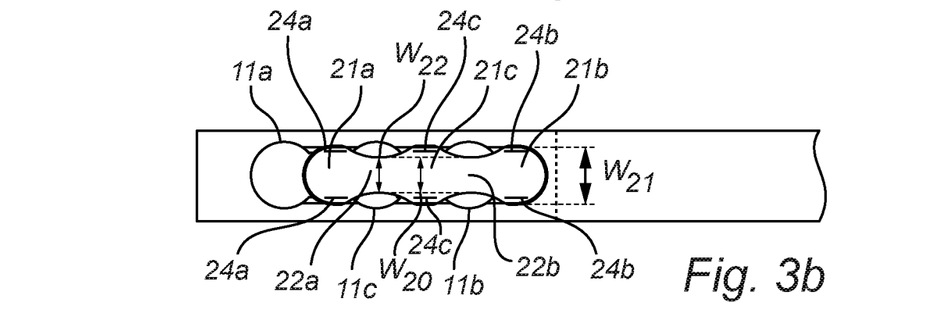
FIG. 3b shows the parts of the joint in the locked position.

When the furniture parts 1, 2 has been joint together in the position shown in FIG. 3*a* the engagement between the grooves 13*a-b* and the protrusions 23*a-b* prevents the pin 20 from being pulled outward in the height/depth direction. The grooves 13*a-b* and protrusions 23*a-b* are designed such that there will be a frictional engagement between the surfaces of the grooves 13*a-b* and protrusions 23*a-b*. Basically they are preferably designed such that there is a slight interference fit between the grooves 13*a-b* and protrusions 23*a-b*. Preferably the heights $H_{23a}$ and $H_{23b}$ of the positions of the protrusions 23*a-b* and the depths $D_{13a}$ and $D_{13b}$ of the grooves 13*a-b* are chosen such that there will be a slight interference fit between the surface 1*a* in which the recess 10 is formed and the surface 2*a* from which the pin 20 extends. It is preferred that the surfaces 1*a* and 2*a* are major surfaces of the furniture parts 1, 2 (at least in the vicinity of the recess and pin). It is e.g. preferred that the surface 1*a* of the first furniture part 1 has such an extension in the width direction on both sides of the recess that the surface 2*a* of the second furniture part 2 may slide along the surface 1*a* during the movement M2. However it may be noted that the surfaces 1*a*, 2*a* need not be major surfaces of the furniture parts 1, 2, but may instead be at a plane different from the major surfaces of the furniture parts 1, 2.

Figure 1B:
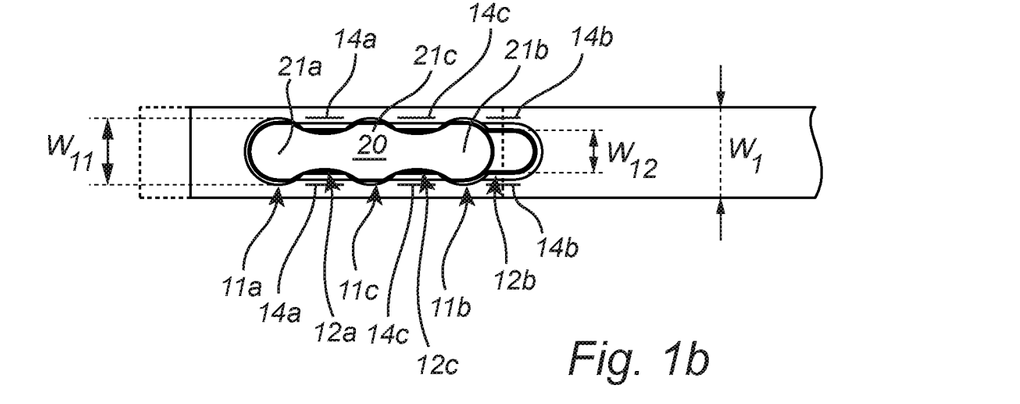
FIG. 1b shows the parts of the joint being aligned relative to each other for insertion or removal.
Figure 1C:
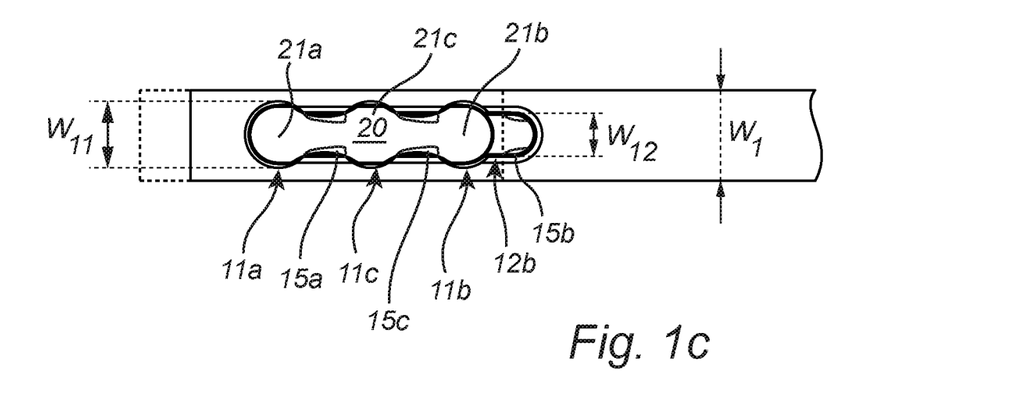
FIG. 1c corresponds to FIG. 1b and shows an alternative embodiment.

As shown in FIG. 1*b* and FIG. 1*c*, the greatest width $W_{11}$ of the insertion portions 11*a-c* is about 75% of the width $W_1$ of the furniture part 1 along the recess 10. Since the side wall parts of the insertion portions 11*a-c* will not carry any load they may from a load bearing perspective basically be as thin as the manufacturing process allows. However, the thickness of the walls still needs to be sufficient such that there is sufficient load bearing capacity of the wall in those parts of the wall extending along the locking portions and being located outside the bottoms of the grooves. For strong wood based materials, such as natural wood, glued timber pieces, wood laminates, or laminates of wood-like materials, such as bamboo, it is contemplated that the insertion portions 11*a-c* may have a width $W_{11}$ being up to about 90% of the width $W_1$ of the furniture part 1 along the recess 10. For comparably weaker wood based materials, such as wood based composite materials, such as fibreboards, chipboards, or the like, it is contemplated that the insertion portions 11*a-c* may have a width being up to about 50% of the width $W_1$ of the furniture part 1 along the recess 10.

Similarly, a greatest width $W_{21}$ of the locking portions 21*a-c* of the pin is at least 50% of a minimum width $W_2$ along the base of the furniture part 2. This is considered efficient use of the material thickness to provide a strong pin 20. In practice a greatest width $W_{21}$ of the locking portions 21*a-c* of the pin is less than 100% of a minimum width $W_2$ along the base of the furniture part 2.

As shown in FIG. 1*a*, each groove 13*a-b* has across the longitudinal direction L an essentially V-shaped cross-section. In the cross-section the grooves 13*a-b* has an upper major wall portion 13*a'-b'* being inclined in a direction outwardly and downwardly and a lower major wall portion 13*a"-b"* being inclined in a direction outwardly and upwardly and a groove bottom portion 13*a"-b"'* connecting said upper and lower wall portions 13*a'-b'* and 13*a"-b"*.

The grooves 13*a-b* are also provided with a small longitudinally extending protrusion 13*a""-b""*. The protrusion 13*a""-b""* is formed in the upper major wall portion 13*a'-b'*. This protrusion 13*a""-b""* aids in forming a frictional engagement between the first and second furniture part 1, 2 without making it too difficult to slide the two parts 1, 2 in the relative movement M2. The protrusions 13*a""-b""* are so small that they are fairly easily deformed as the customer moves the second part 2 in the relative movement M2. The protrusions may alternatively be at the male part.

Figure 4:
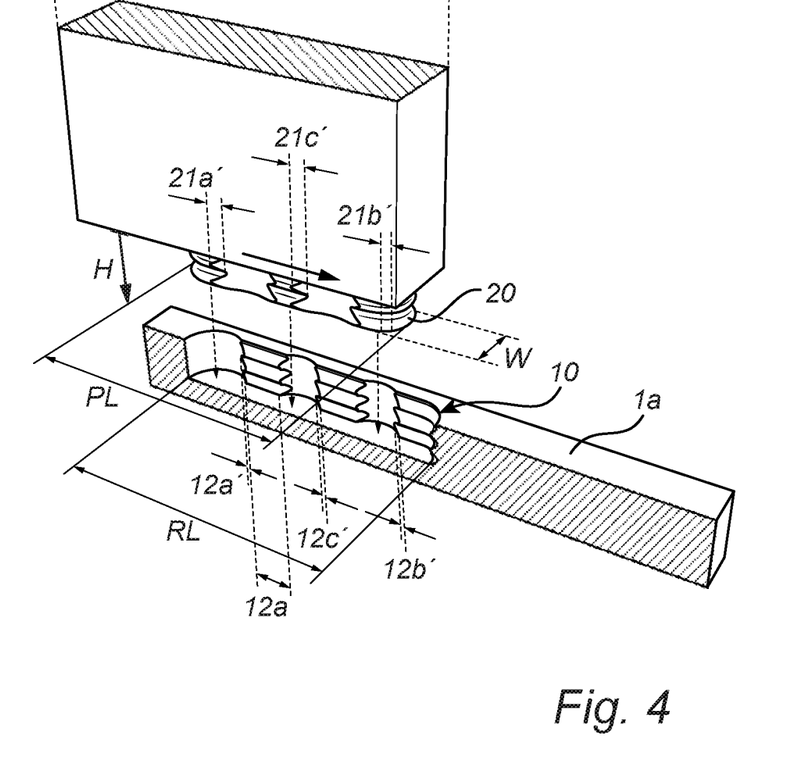
FIG. 4 corresponds to FIG. 1a and shows the female part of the joint in a cross-section.

As is shown in FIG. 4, at the transitions between the insertion portion 11*a* and the locking portion 12*a*, between the insertion portion 11*c* and the locking portion 12*c*, and between the insertion portion 11*b* and the locking portion 12*b*, respective groove 13*a-b* of the locking portions 12*a-c* comprises an inlet portion 12*a'-c'*. As viewed from above, the side wall portion of the locking portion is at this inlet portion 12*a'-c'* inclined inwardly from the insertion portion 11*a-c* towards the minimum width $W_{12}$ of the locking portions 12*a-c*. Thereby the result will be that the upper and lower wall portions 13*a'-b'*, 13*a"-b"* will increase in height (in the width direction) when following the longitudinal direction L from the insertion portions 11*a-c* to respective locking portion 12*a-c*. This way the grooves 13*a-b* will initially present a shallow V-shape which makes it easy to find the right position for the protrusions 23*a-b* of the pin 20 without any jamming effect occurring. The inlet portions 12*a'-c'* constitute between 10% and 33% of the active length of respective groove. The active length is in this embodiment considered to be the distance travelled in sliding movement M2. When the pin 20 is inserted into the recess 10 there is no locking engagement between protrusions 23*a-b* and grooves 13*a-b*. As the parts 1, 2 are slid relative to each other in the movement M2, there will be a locking engagement with the length equal to the length of the movement M2. This is true since there is no distance between the starting point of the grooves and the insertion portion of the recess, or between the starting point of the protrusions and the core portion of the pin. If the design is such that there is a gap or distance between the insertion portion and the grooves of the recess or a gap between the core portion and the protrusions of the pin, the greatest of those distances should be deducted from the length of the movement M2 to determine the active length of the grooves and protrusions.

As shown in FIG. 1*a*, each protrusion 23*a-b* has across the longitudinal direction L an essentially V-shaped cross-section. In the cross-section the protrusions 23*a-b* has an upper major wall portion 23*a'-b'* being inclined in a direction outwardly and downwardly and a lower major wall portion 23*a"-b"* being inclined in a direction outwardly and upwardly and a protrusion top portion 23*a"'-b"'* connecting said upper and lower wall portions 23*a'-b'* and 23*a"-b"*.

As shown in the figures, at the transition between the core portion 22*a* and the locking portion 21*a*, between the core portion 22*b* and the locking portion 21*c*, and at a portion of the locking portion 21*b* facing away from the other locking portions 21*a*, 21*c*, respective protrusion 23*a-b* comprises an initial portion 21*a'-c'*. As viewed from above, the side walls of the pin 20 are at this initial portion 21*a'-c'* inclined outwardly from the core portions 22*a-b* towards the locking portions 22*a*, 22*c*. As viewed from above, the end portion of the locking portion 22*b* is circular thereby also presenting an inclined surface. Thereby the result will be that the upper and lower wall portions 23*a'-b'*, 23*a"-b"* will increase in height (in the width direction) when following the longitudinal direction L from the core portion 22*a* towards the locking portion 21*a*, and from the core portion 22*b* towards the locking portion 21*c*. The initial portion 21*a'*, 21*c'* constitutes between 10% and 33% of the active length of respective protrusion. The initial portion 21b' may constitute a greater fraction since it will enter into an end portion of the recess 10 and thereby carry load once fully inserted into the end of the recess.

It is contemplated that there are numerous modifications of the embodiments described herein, which are still within the scope of the invention as defined by the appended claims.

As shown in FIG. 1c, the recess 10 may be provided with a wedge shape 15a-c overlaying the shape of the grooves 13a-b of the locking portions 12a-c. The wedge shape 15a-c may be a formed by a wedge shape of the side walls 14a-c such that the distance between the side walls 14a-c. Such a wedge shape may e.g. entail that the width of the recess 10, decreases when following the longitudinal direction L. The wedge shape 10 may alternatively be formed by a wedge shape of the cross-section of the grooves 13a-b of the locking portions. The angle of upper and lower walls forming the cross-section of the grooves may e.g. be changed such that the space available for the protrusions 23a-b of the pin 20 will decrease when following the longitudinal direction L. Alternatively, the wedge shape may be a combination of the two alternatives mentioned. It may also be noted that the wedge shape may alternatively be formed on the pin 20 instead.

Other modifications may entail that the pin may for instance be formed of a separately formed member which is attached to the second furniture part. The pin may in such a case be formed of another material, such a plastic material.

One specific site of application for the furniture joint is e.g. cross braces for stabilising the legs of a chair. Basically the joint is useful for applications where a comparably thin bar is adapted to be attached to another furniture part. In such a case the comparably thin bar is advantageously provided with the pin and the other furniture part is advantageously provided with the recess.

The invention claimed is:

1. Furniture part comprising a male part of a joint, wherein the male part of the joint comprises a pin extending from a base of the furniture part along a height direction (H) towards a free end of the pin, the pin having a cross-section with a pin length (PL) extending along a longitudinal direction (L) and a width (W) which is perpendicular to the longitudinal direction (L), which width (W) varies along the longitudinal direction (L), wherein the pin has, as seen along the longitudinal direction (L), a first portion forming a locking portion and having a first width ($W_{21}$), a second portion connected to the first portion and forming a core portion and having a second width ($W_{22}$) being smaller than the first width ($W_{21}$), a third portion forming a locking portion and having a third width ($W_{21}$), wherein opposing, longitudinally extending, side wall portions of the first portion are each provided with a first protrusion and a second protrusion extending alongside each other and both extending in the longitudinal direction (L) along the first portion and extending outwardly in the direction of the width (W) from a first portion core width ($W_{20}$) to said first width ($W_{21}$), wherein the first protrusion is located at a first height ($H_{23a}$) of the pin and the second protrusion is located at a second height ($H_{23b}$) of the pin, which second height ($H_{23b}$) is larger than the first height ($H_{23a}$), wherein opposing, longitudinally extending, side wall portions of the third portion are each provided with a first protrusion and a second protrusion extending alongside each other and both extending in the longitudinal direction (L) along the third portion and extending outwardly in the direction of the width (W) from a third portion core width ($W_{20}$) to said third width ($W_{21}$), wherein the first protrusion is located at a first height ($H_{23a}$) of the pin and the second protrusion is located at a second height ($H_{23b}$) of the pin, which second height ($H_{23b}$) is larger than the first height ($H_{23a}$), and wherein, at the transition between the first and second portion and at a portion of the third portion facing away from the second portion, respective protrusion comprises an initial portion formed by a gradual increase in height of upper and lower wall portions of the cross-section of the protrusion as seen counter to the longitudinal direction (L).

2. Furniture part according to claim 1, wherein a greatest width ($W_{21}$) of the first or third portion of the pin is at least 50% of a minimum width ($W_2$) along the base of the furniture part.

3. Furniture part according to claim 1, wherein each protrusion, across the longitudinal direction (L), has an essentially V-shaped cross-section, comprising an upper major wall portion being inclined in a direction outwardly and downwardly and a lower major wall portion being inclined in a direction outwardly and upwardly and a protrusion top portion connecting said upper and lower wall portions.

4. Furniture part according to claim 1, wherein the male part of the joint is integrally formed in the furniture part.

5. Furniture part according to claim 1, wherein the initial portion of the third portion is formed by the end of the third portion facing away from the second portion having a convex curvature.

6. Furniture part according to claim 1, wherein the initial portion constitutes between 10% and 33% of the active length of respective protrusion, wherein the active length is considered to be the length the second furniture part slides along the first furniture part as the parts are locked together.

7. Furniture part according to claim 1, wherein the first protrusion of the first portion has the same cross-sectional shape as and is aligned with the first protrusion of the third portion, and wherein the second protrusion of the first portion has the same cross-sectional shape as and is aligned with the second protrusion of the third portion.

* * * * *